United States Patent
Linden et al.

(10) Patent No.: US 10,029,177 B2
(45) Date of Patent: Jul. 24, 2018

(54) SYSTEM AND METHOD FOR A VIDEOGAME WITH A SECONDARY METAGAME

(71) Applicant: Activision Publishing, Inc., Santa Monica, CA (US)

(72) Inventors: John Linden, Santa Monica, CA (US); Trey Watkins, Santa Monica, CA (US); Mark Rubin, Santa Monica, CA (US); Brian Bright, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 1270 days.

(21) Appl. No.: 14/089,255

(22) Filed: Nov. 25, 2013

(65) Prior Publication Data
US 2015/0126269 A1    May 7, 2015

Related U.S. Application Data

(60) Provisional application No. 61/900,320, filed on Nov. 5, 2013.

(51) Int. Cl.
*A63F 13/46* (2014.01)
*A63F 13/30* (2014.01)
*A63F 13/88* (2014.01)

(52) U.S. Cl.
CPC .............. *A63F 13/30* (2014.09); *A63F 13/46* (2014.09); *A63F 13/88* (2014.09)

(58) Field of Classification Search
CPC ........ A63F 13/005; A63F 13/30; A63F 13/46; A63F 13/88; A63F 13/798; A63F 2300/61; A63F 2300/6036
See application file for complete search history.

(56) References Cited

U.S. PATENT DOCUMENTS

| | | | |
|---|---|---|---|
| 6,758,754 B1 * | 7/2004 | Lavanchy | A63F 13/12 434/350 |
| 2007/0294089 A1 | 12/2007 | Garbow et al. | |
| 2008/0004117 A1 * | 1/2008 | Stamper | G07F 17/32 463/42 |
| 2008/0096663 A1 * | 4/2008 | Lieberman | A63F 13/10 463/42 |
| 2010/0075761 A1 * | 3/2010 | Lord | A63F 13/85 3/85 |
| 2010/0120525 A1 | 5/2010 | Baerlocher et al. | |
| 2010/0240461 A1 | 9/2010 | Rasmussen et al. | |
| 2011/0028207 A1 | 2/2011 | Gagner et al. | |
| 2011/0092282 A1 * | 4/2011 | Gary | A63F 13/12 463/31 |
| 2011/0111854 A1 | 5/2011 | Roberts et al. | |

(Continued)

OTHER PUBLICATIONS

U.S. Appl. No. 15/339,641, filed Oct. 31, 2016, Jay Puryear, Jennifer Puno, Chris Chernoff, US 2017-0043261 A1, Office Action dated Apr. 10, 2017.

*Primary Examiner* — Jasson Yoo
(74) *Attorney, Agent, or Firm* — Klein, O'Neill & Singh, LLP

(57) ABSTRACT

A videogame playable on a traditional gaming platform has an associated metagame playable on a handheld "second screen" device. In some embodiments, a player's performance in the videogame affects the player's performance in the metagame.

10 Claims, 6 Drawing Sheets

(56) References Cited

U.S. PATENT DOCUMENTS

| | | | |
|---|---|---|---|
| 2011/0244965 A1* | 10/2011 | Takahashi | A63F 3/00006 463/43 |
| 2011/0269548 A1 | 11/2011 | Barclay et al. | |
| 2012/0135792 A1 | 5/2012 | Johnson | |
| 2012/0302332 A1 | 11/2012 | Buhr | |
| 2013/0288757 A1* | 10/2013 | Guthridge | A63F 13/12 463/2 |
| 2013/0288788 A1* | 10/2013 | Lim | A63F 13/795 463/31 |
| 2013/0331191 A1* | 12/2013 | Puryear | A63F 13/12 463/42 |
| 2014/0295940 A1* | 10/2014 | Tanaka | A63F 13/00 463/24 |
| 2014/0364238 A1* | 12/2014 | Koh | A63F 13/00 463/42 |

\* cited by examiner

SYSTEM AND METHOD FOR A VIDEOGAME WITH A SECONDARY METAGAME

CROSS REFERENCE TO RELATED APPLICATIONS

This application claims the benefit of the filing of U.S. Provisional Patent Application No. 61/900,320, filed on Nov. 5, 2013, the disclosure of which is incorporated by reference herein.

BACKGROUND OF THE INVENTION

The present invention relates generally to videogames, and more particularly a videogame with a secondary metagame.

Videogames are enjoyed by many, often allowing videogame players to virtually participate in otherwise unavailable activities, whether due to requirements of skill, experience, or equipment availability, or simply due to inherent dangers of the activities.

Videogames are increasingly being played on a variety of gaming platforms. While many videogames are still being played on traditional gaming platforms such as videogame consoles and personal computers, videogames are now also being played on new platforms such as handheld devices (e.g., smartphones, tablets, and other handheld devices).

Despite advances in handheld device technology, traditional gaming platforms such as videogame consoles and personal computers generally provide greater compute and graphics processing capabilities. Traditional gaming platforms have other advantages as well, such as the ability to connect to a larger screen and more sophisticated input devices. As a result, many of the cutting edge videogames are still being developed for traditional gaming platforms. Compared to videogame consoles and personal computers, however, handheld platforms provide players greater portability and allow players to engage their videogames from anywhere they can use their handheld devices.

Combining benefits provided by handheld platforms with advantages of traditional gaming platforms may be difficult, however.

BRIEF SUMMARY OF THE INVENTION

Some aspects of the present invention relate to a computer-implemented method for providing a metagame associated with a primary videogame, comprising: entering a first entity into the metagame associated with the primary videogame, the metagame comprising a plurality of entities competing to achieve one or more metagame objectives; determining one or more performance metrics associated with the first entity's performance in the primary videogame; for each metagame objective, calculating a score for the first entity, the score being based on a scoring algorithm that uses at least one of the first entity's determined performance metrics; determining that the first entity has achieved a predefined score in a metagame objective; and in response to determining that the first entity has achieved a predefined score in a metagame objective: changing the scoring algorithm of the metagame objective; and awarding a bonus to the first entity in the videogame.

DETAILED DESCRIPTION

Figure 1:
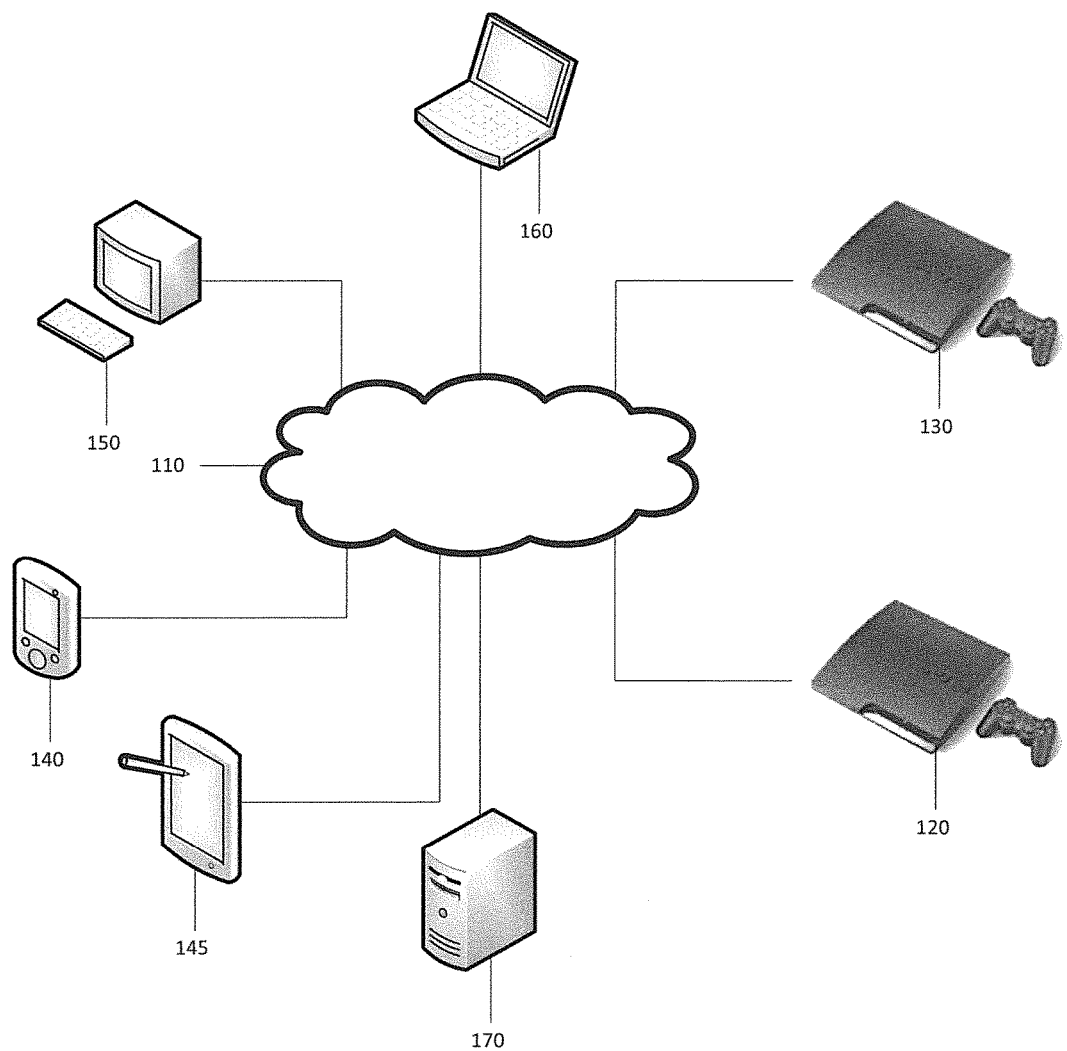
FIG. 1 is a diagram of a system in accordance with aspects of the invention.

FIG. 1 is a block diagram illustrating an exemplary system 100 in accordance with aspects of the present invention. System 100 provides for a primary videogame playable on a traditional gaming platform and a secondary metagame playable on a handheld gaming platform.

System 100 includes gaming platforms 120-160. Gaming platforms 120-160 comprise various compute devices suitable for executing videogames and communicating over communication network 110. In FIG. 1, system 100 comprises "traditional" gaming platforms such as videogame consoles 120 and 130 and personal computers 150 and 160. Examples of videogame consoles include the Microsoft Xbox family of devices, Sony PlayStation family of devices, and Nintendo Wii family of devices. System 100 further comprises handheld gaming platforms (sometimes referred to as "second screen devices") such as smartphone 140 and tablet 145. Other examples of handheld gaming platforms include portable media players, handheld gaming devices, personal digital assistants, and any other handheld device suitable for playing videogames. The gaming platforms 120-160 each have one or more processors, memory, communication circuitry, and associated hardware. Gaming platforms 120-160 may communicate with other gaming platforms 120-160 by sending and receiving data through communication network 110, which may comprise private and public networks. In many embodiments, communication network 110 comprises the Internet. Of course, the number of devices shown in FIG. 1 is merely exemplary, and in most embodiments, many more devices are present.

System 100 further includes one or more game servers 170. Game server 170 may comprise modules that provide certain services. As discussed in more detail below, the modules may include, for example, a matchmaking module, social networking module, data collection module, user profile module, authentication/security module, communication module, and mobile application module.

In accordance with aspects of the invention, players engage in a videogame using traditional gaming platforms such consoles and personal computers. The videogame played on the traditional gaming platforms can be considered the primary videogame, providing the primary videogame experience. Aspects of the invention extend the videogame experience to the players' handheld gaming platforms, allowing players to remain engaged in the videogame experience when they are not using their traditional gaming platforms.

Generally, the primary videogame may be of any genre, for example, first-person shooter games, sports simulation games, real-time strategy games, etc. The primary videogame has an associated and secondary metagame playable on a handheld gaming platform. In many embodiments the metagame is active or operates simultaneously with the primary videogame, and in many embodiments the metagame incorporates actions or the results of actions in the primary videogame in determining outcomes or game states in the metagame. In some embodiments the metagame may operate during only a portion of a primary game, and in some embodiments operation of the metagame may bridge or encompass all or parts of multiple primary games, which may be played during different time periods. In many embodiments, the metagame comprises a different gameplay pattern than the primary videogame. For example, if the primary videogame gameplay pattern is that of a first-person shooter, the metagame gameplay pattern may include real-time strategy elements. In another example, if the primary videogame gameplay pattern is a sports simulation, the metagame gameplay pattern may comprise a coaching gameplay pattern or a leaderboard or tournament bracket gameplay pattern. Although no restrictions are made to the metagame's gameplay pattern, in many embodiments, the metagame's gameplay pattern is one suitable for touch-screen-based inputs.

In some embodiments, the metagame includes one or more metagame objectives. A player's performance towards a given metagame objective may be based on the player's performance in the primary videogame. In the example of the first-person shooter, a player's performance in the primary videogame (e.g., number of targets/kills, number of multiplayer victories, amount of experience earned, amount of items purchased, progress through gameplay levels, time spent playing the videogame, etc.) may be used in the metagame's scoring algorithm. For example, the player's score towards a metagame objective may be based on the number of multiplayer victories earned by the player in the primary videogame. Likewise, in the example of a basketball simulation, a player's performance in the primary videogame (e.g., number of games won, number of points scored, number blocked shots, number of steals, win/loss percentage, number of championships won, etc.) may also be used in the metagame's scoring algorithm.

The metagame may be a single- or multiplayer game. In many embodiments, the metagame is a multiplayer competition between teams of individual players. In particular, many videogames with online multiplayer game modes allow individual players to form teams (sometimes referred to as "clans" or "guilds"). In many embodiments, these teams compete against each other in the secondary metagames. In many embodiments, the performances in the primary videogame of the individual players of a team directly contribute to the team's performance in the metagame. For example, in the first-person shooter example, each team member's multiplayer victories (or targets/kills, earned experience, or any other performance metric) contributes to the team's score for a metagame objective. In some embodiments performance metrics are determined and/or maintained for individual team members, but not the team as a whole, in the primary game, while performance metrics, for example in the form of a score, are determined and/or maintained for the team as a whole in the metagame. In some embodiments performance metrics are determined and/or maintained for the team as a whole in both the primary game and the metagame.

The player's (or team's) performance in the metagame (e.g., winning the metagame or achieving certain metagame objectives) may earn bonuses and rewards useful in the primary videogame. In the example of the first-person shooter, if a particular team wins the metagame or achieves certain metagame objectives, the individual team members of the winning team may be awarded bonuses useful in the primary videogame (e.g., experience points, virtual currency, in-game items, status, items, etc.).

These and other aspects of the invention will be discussed in more detail by way of example below. The following discussion uses an example of a first-person shooter videogame with an associated secondary metagame, but the teachings of the present invention may be applied to any videogame in which a secondary metagame is used to extend the experience of the primary videogame.

In a preferred embodiment, the primary videogame is a first-person shooter videogame. Players engage in the primary videogame using traditional videogame platforms, such as videogame consoles and personal computers. The primary videogame comprises single- and multiplayer gameplay. The multiplayer gameplay allows players and teams to compete in various online multiplayer game modes (e.g., capture the flag, search and destroy, domination, team death match, etc.).

The first-person shooter primary videogame includes an associated secondary metagame playable on a handheld gaming platform (e.g., smartphone, tablet, or other portable computing device). The secondary metagame comprises strategy and tactical elements. The secondary metagame allows the player to remain engaged in the videogame experience even when the player does not have access to the player's traditional gaming platform. Aspects of the primary videogame and secondary metagame are described below.

Figure 2:
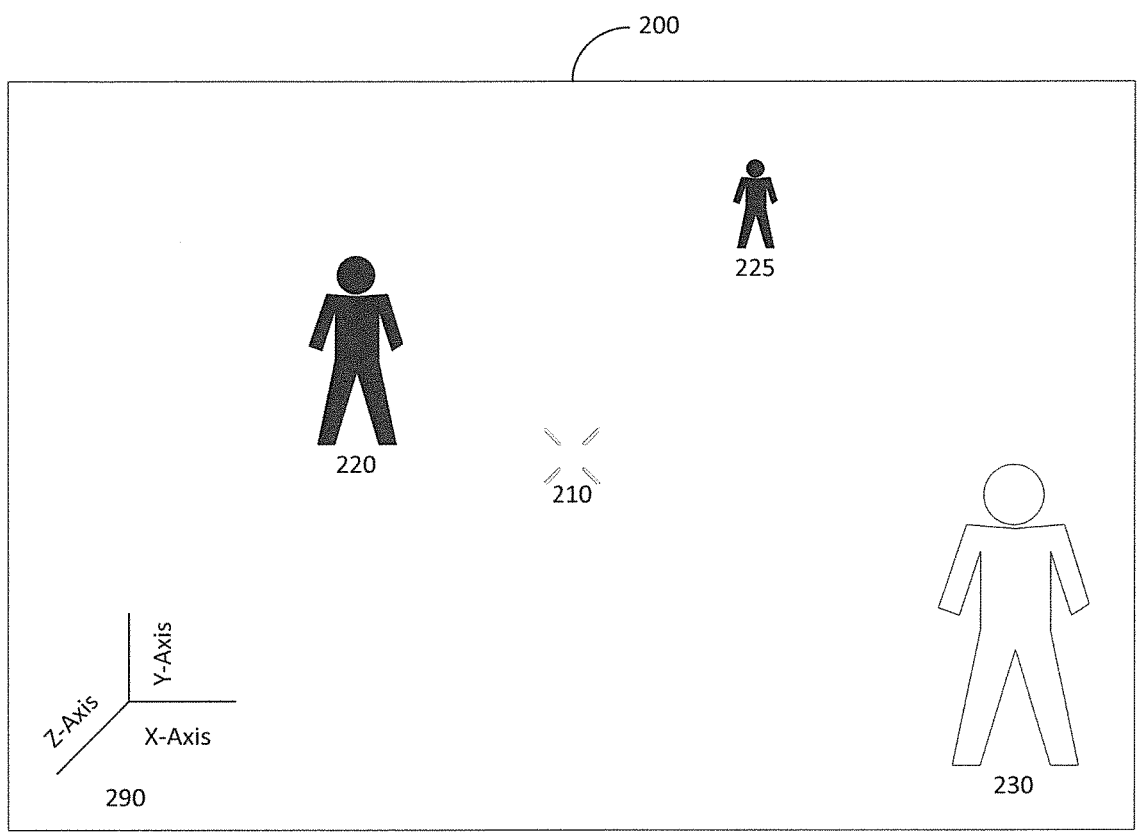
FIG. 2 is a diagram of a display from a first-person shooter videogame in accordance with aspects of the invention.

FIG. 2 is an example display of a primary videogame reflecting a traditional FPS gameplay pattern, albeit in simplified form. In the traditional FPS gameplay pattern 200 depicted in FIG. 2, a player views a virtual environment of a gameworld from the perspective of an avatar controlled by the player. The player may encounter one or more other avatars and targets, for example enemy targets 220 and 225 and teammates or squad members 230. The player controls provides complete control over his avatar, generally without significant computer assistance. In gameplay, the player may also issue commands to the one or more teammates or squad members 230, which may be controlled by the computer, in accordance with the issued commands, or by other players in multiplayer modes.

In FIG. 2, a z-axis extends away from the facing direction of the player's avatar (not shown in FIG. 2) or viewpoint towards the horizon. (Note that Cartesian axis 290 is included for reference only and in most embodiments would not be displayed in FPS interface 200.) In some embodiments, FPS gameplay pattern 200 may present a crosshair 210 that helps the player aim his weapon. Generally, the position of crosshair 210 relative to the targets when the player fires his weapon determines whether the player hits or misses any given target. In some embodiments, rays representing the trajectory of the fired shots are cast from the center of the screen, or in various embodiments some other point on the screen, for example a bottom center position, towards crosshair 210. If a ray intersects with a target, the target is hit; otherwise, the target is missed. In some embodiments, crosshair 210 is locked to the center of the screen. In other embodiments, crosshair 210 may be freely moved about the screen by the player. Although crosshair 210 is depicted in an "x" configuration, crosshair 210 may be of any configuration, including for example, a cross, a circle, a cross within a circle, etc. In some embodiments, there is no visible crosshair, and shots are simply fired to a predetermined location relative to the player's viewpoint (e.g., the center of the screen). In some embodiments, the FSP gameplay pattern may present a heads-up display (HUD) (not shown) that provides additional information to the player (e.g., information regarding ammunition, weapons, health, mission objectives, maps, time, player-to-player communications, etc.).

Figure 3:
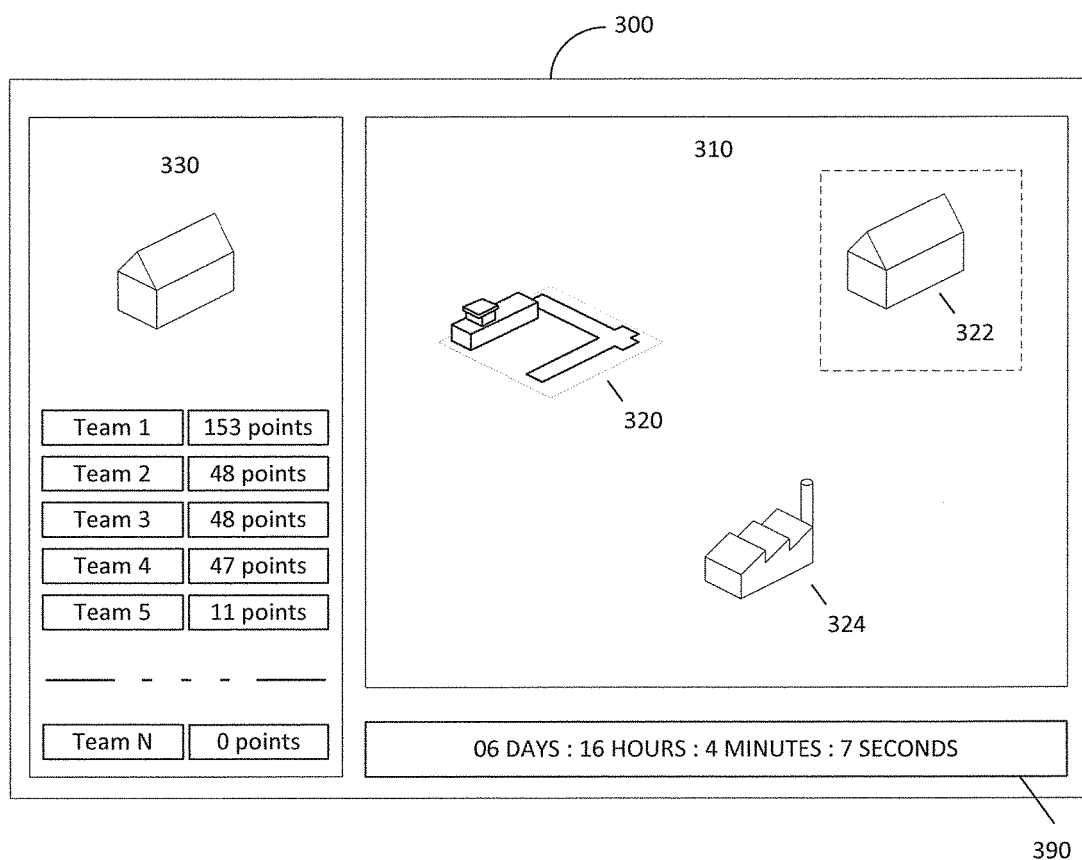
FIG. 3 is a diagram of a display from a metagame associated with a first-person shooter videogame in accordance with aspects of the invention.

FIG. 3 is an example display from a secondary metagame associated with the first-person shooter videogame. In various embodiments the metagame display presentation is displayed, or selectable for display, during play of the metagame in various embodiments. In contrast to the first-person shooter gameplay pattern of FIG. 2, the strategic gameplay pattern 300 of FIG. 3 is more suited for touch-screen-based engagement in that it is relatively easy to control compared to a first-person shooter game. Multiple teams (or, in some embodiments, individual players) compete to earn the most metagame points over a predefined competition period (e.g., x hours, days, weeks, months, etc.). In this particular example of a metagame, teams are awarded metagame points for capturing and/or controlling strategic locations 320, 323, and 324 shown in map 310. In this example, the strategic locations represent an airport (320), warehouse (322), and factory (324). While three strategic locations are shown in this example, any number may be used.

Each strategic location is associated with one or more multiplayer game modes from the first-person shooter primary videogame. For example, strategic location 320 may be associated with the "team death match" multiplayer game mode, strategic location 322 may be associated with the "capture the flag" multiplayer game mode, and strategic location 324 may be associated with the "search and destroy" multiplayer game mode. As team members complete matches in these multiplayer game modes, their performance metrics will contribute to the team's "capture score" for the associated strategic location. For example, when a team member wins (or earns targets/kills, experience, etc.) a Capture the Flag match, the team's capture score for strategic location 322 is incremented according to some predefined scoring algorithm (e.g., each win earns 5 capture points, each target/kill earns 1 capture point, etc.). Once a team reaches a predefined objective for a strategic location (e.g., earns a predefined number of capture points for the strategic location), the team captures the strategic location. For example, in one embodiment, the predefined objective for strategic location 322 may be to earn 200 capture points. In some embodiments a team, for example through action of a member of a team, prioritizes available strategic locations, with points associated with the strategic locations varying with those presentations, in some cases only with respect to that team.

In various embodiments the metagame display presentation is displayed, or selectable for display, during play of the metagame in various embodiments. In FIG. 3, leaderboard 330 shows the teams' capture scores for the warehouse strategic location 322, which is selected in map 310. As depicted in FIG. 3, Team 1 is currently leading with 153 capture points. Because no team has yet reached 200 capture points, strategic location 322 has not yet been captured and is not being controlled by any particular team.

The team that captures a strategic location (i.e., achieves a predefined objective for the strategic location) will be awarded metagame points that go towards the team's overall metagame score. The team will now be considered to be "holding" or "controlling" the strategic location. In some embodiments, map 310 will update to reflect the strategic location's capture (for example, by changing the appearance of the strategic location or by adding the capturing team's insignia or emblem next to the strategic location). The holding team may be awarded additional metagame points for holding onto the strategic location for predefined periods of time (e.g., x metagame points per hour or day).

In some embodiments, as soon as a strategic location is captured, the scoring algorithm for that strategic location changes. For example, while a strategic location is held, the performance metrics of the non-holding teams will decrement the holding team's capture score for the strategic location (instead of incrementing their own capture scores for the strategic location). The holding team's performance metrics will still increment its own capture score for the strategic location, except with a higher multiplier (e.g., each win earns 15 capture points instead of 5 capture points, each target/kill earns 3 capture points instead of 1 capture point, etc.). In such an example, the metagame's scoring algorithm pits the non-holding teams against the holding team. The scoring algorithm can be tuned such that it is unlikely for the holding team to maintain control of the strategic location for a long period of time.

Once the holding team's capture score for the held strategic location reaches zero, the strategic location will revert to being un-captured, and scoring for every team will revert to the default scoring algorithm. The team that was in second place before capture will now be in the lead and every team will be able to try to capture the strategic location accordingly. In some embodiments, on subsequent captures of the given strategic location, the awarded metagame points will decrement by a defined value. This means that the first capture will be worth the most metagame points (e.g., 50 metagame points), while subsequent captures will be worth incrementally less (e.g., 40 metagame points for the second capture, 30 metagame points for the third capture, etc.).

At the end of the metagame competition, the team with the highest overall metagame score wins. The teams' performances in the metagame may result in bonuses and rewards that may be used in the primary videogame. For example, while holding a given strategic location, the team may receive experience boosts while playing certain game modes (e.g., 20% bonus experience while playing Capture the Flag in the primary videogame), earn bonus virtual currency for completing certain tasks, receive in-game items (some of which may only be obtained as a bonus for achieving metagame objectives), and receive status items (such as special team emblems and logos, team recognition on websites, leaderboards, etc.). Similar bonuses and rewards may be awarded to the team who scored the most metagame points at the conclusion of the metagame (or, in some embodiments, the top 2, 3, etc. teams). In some embodiments, performance in the metagame may be used to determine entrance into tournaments or events relating to the videogame.

The secondary metagame provides several advantages to the primary videogame experience. For example, because the secondary metagame is designed for handheld gaming devices, it is easy for players to engage the secondary metagame from anywhere they have access to their second screen. This, in turn, builds engagement with the primary videogame. In addition, the secondary metagame builds social engagement amongst team members and competing teams. In order to succeed in the metagame and achieve the various metagame objectives, team members must coordinate their activities in the primary videogame. Furthermore, by rewarding metagame performance with bonuses and rewards that may be used in the primary videogame, the players are incentivized to participate and succeed in the secondary metagame.

In some embodiments, the players of the secondary metagame may acquire (either through performance in the secondary metagame or through purchase in a virtual store associated with the secondary metagame) additional bonuses to be used in the secondary metagame. In some embodiments, the bonuses may increase the amount of capture points awarded based on the player's performance metrics in the primary videogame. For example, while a Capture the Flag win in the primary videogame may normally award a player 5 capture points in the metagame, the bonus may cause the win to award 10 capture points. As another example, the bonus may cause capture points earned in one territory to apply to additional territories.

The bonuses may be presented in various forms, but in some embodiments, the bonuses are presented as packs of virtual trading cards, which may be purchased or earned. The trading cards may have different bonuses and appearances, which may be activated by the player from within the secondary metagame. The bonus conferred by a given trading card may, in some embodiments, have a limited duration that is shorted than the duration of the metagame. In some embodiments, the bonuses are transferable to other players, or may be applied to a teammate.

One of ordinary skill would recognize that many of the above details about first-person shooter gameplay and metagame gameplay are exemplary and may be changed in various embodiments in accordance with aspects of the invention.

Figure 4:
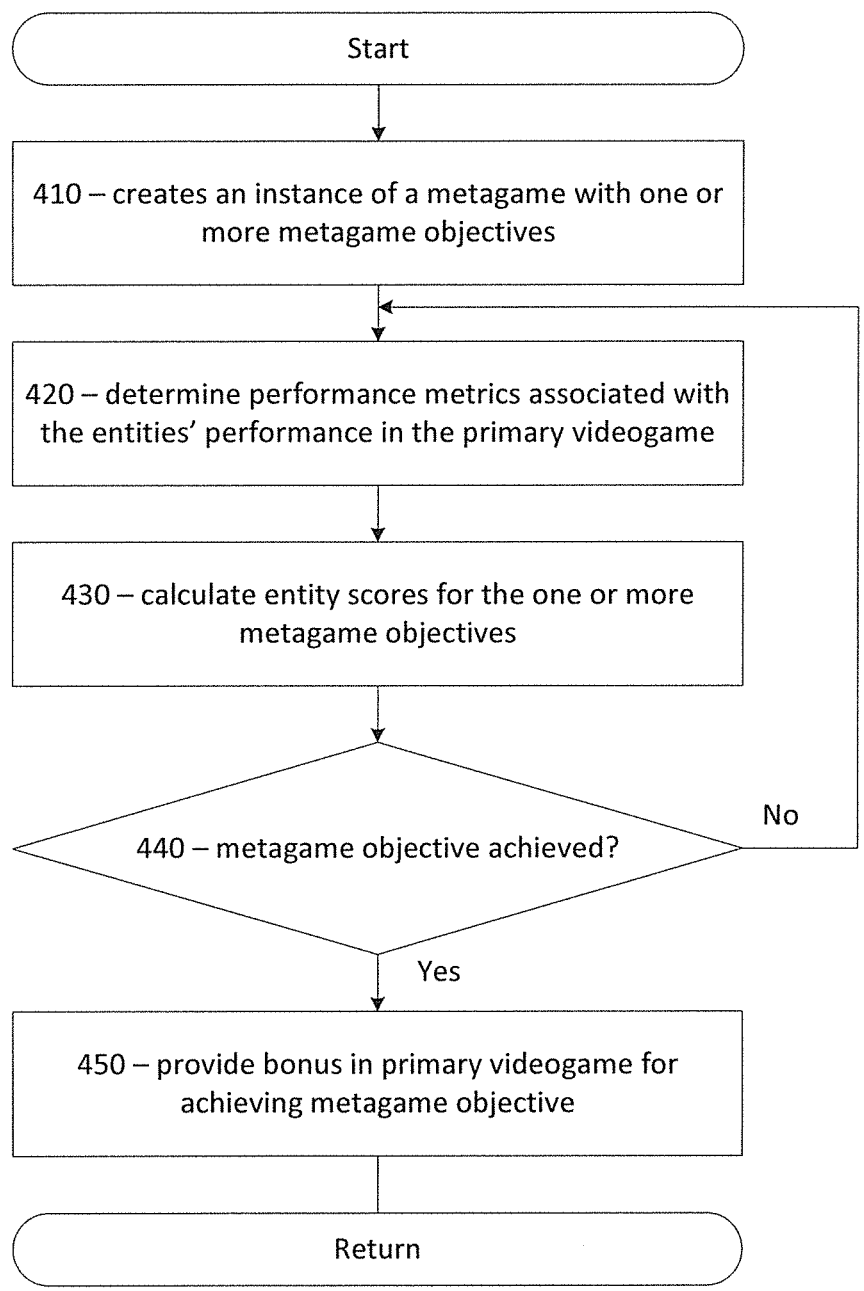
FIG. 4 is a flowchart of a process relating to conducting a metagame in accordance with aspects of the invention.

FIG. 4 is a flowchart of a process in accordance with aspects of the invention. The process may be performed, for example, by the processor and system described in connection with FIGS. 5 and 6, below, or the system or components thereof of FIG. 1. The process is useful in providing a primary videogame experience playable on a traditional gaming platform and an associated metagame playable on a handheld gaming device.

In block 410, the process creates an instance of a metagame with one or more metagame objectives. For example, the metagame objectives may include capturing and holding one or more territories in the metagame (as described in connection with FIG. 3). The metagame is played by a plurality of entities, which in some embodiments are teams composed of individual players. In other embodiments, the entities may be individual players or a combination of teams and individual players. The process may, in some embodiments, match competing entities based on the entities' team size, experience level, win/loss record, geographic location, or other relevant attributes. In some embodiments, the process matches and enters entities into regularly recurring metagames, for example, teams may be entered into metagames once every two weeks. In some embodiments, entities are not automatically entered into metagames and may instead choose to join a metagame.

In block 420, the process determines and collects performance metrics associated with the entities' performances in the primary videogame. The specific performance metrics collected is programmable and will vary depending on the specific primary videogame being played. For example, in a first-person shooter videogame, the process may collect one or more of an entity's win/loss record (overall or in one or more specific game modes), targets/kills, points scored, earned experience, kill streaks, kill/death record, time spent playing the game, or any other gameplay statistic.

In block 430, the process calculates entity scores for one or more metagame objectives. In many embodiments, the scoring algorithm for calculating an entity's score in a particular metagame objective is based on one or more of the entity's collected performance metrics from the primary videogame. Thus, the entity's performance in the primary videogame directly contributes towards the entity's score for the metagame objective. Alternatively or additionally, the scoring algorithm may be based solely on the entity's performance in the metagame (and not tied to the entity's performance in the primary videogame).

In block 440, the process determines whether an entity has achieved a metagame objective. If not, the process proceeds to block 420. If so, the process proceeds to block 450.

In block 420, the process provides to the entity that achieved the metagame objective a bonus or reward useful in the primary videogame. For example, the team may receive experience boosts, earn bonus virtual currency, receive in-game items, and receive status items.

The process thereafter returns.

Figure 5:
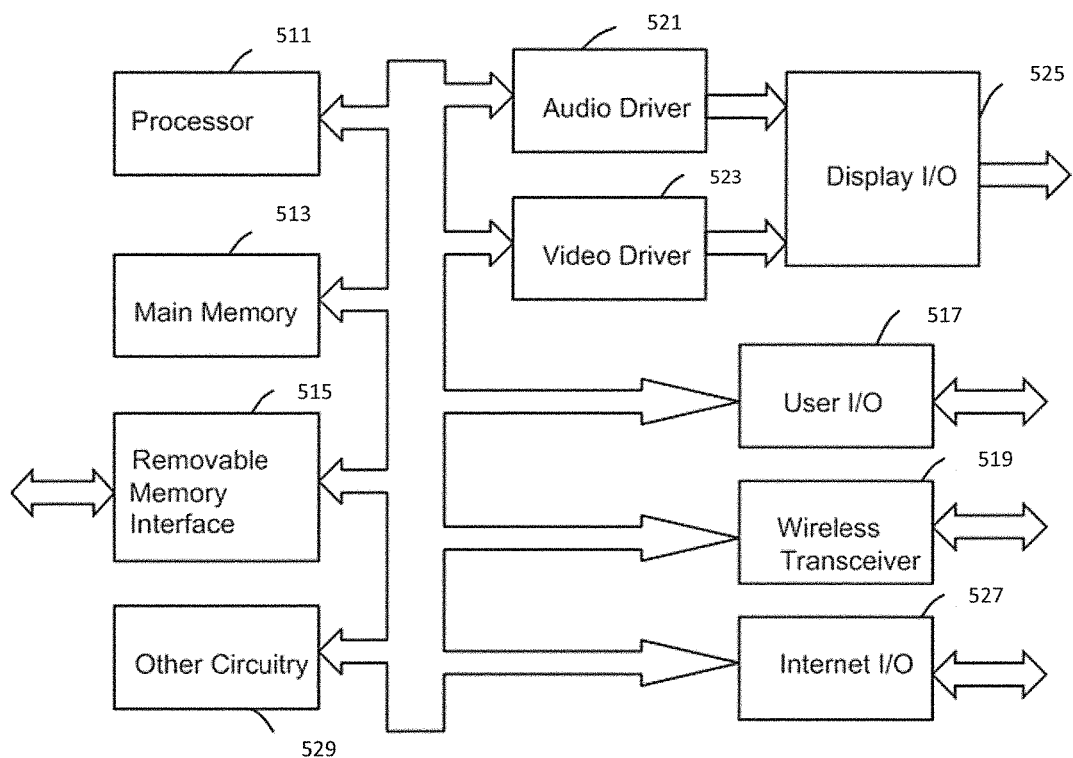
FIG. 5 is a diagram of a processor and related circuitry useful in accordance with aspects of the invention.

FIG. 5 is an example of a block diagram of a processor and associated circuitry useful in a gaming platform in accordance with aspects of the invention. As shown in FIG. 5, a processor 511 is connected to other components via a bus. The other components include a main memory 513 and a removable memory interface 515, which may be coupled to a removable memory device, for example, a SD memory card. The processor may execute instructions retrieved from main memory and/or the removable memory device to control gameplay. For example, the instructions may be for determining possible movements, positions, and locations of the player's avatar and/or targets.

The processor is coupled to an audio driver 521 and a video driver 523. The audio driver produces sound signals and the video driver produces image signals. The sound signals and image signals are transmitted via a display I/O device 525. The display I/O device generally supplies the sound and image signals to sound and display devices that may be external to the gaming platform or incorporated in the gaming platform.

The processor may also be coupled to a user I/O device 517, a wireless transceiver 519, an Internet I/O device 527, and other circuitry 529. The user I/O device may receive signals from an input device (e.g., joystick, gamepad, keyboard, mouse, touchscreen, etc.) being used by the player and provide inputs, for example, during gameplay. The Internet I/O device provides a communication channel that may be used, for example, for multiplayer games.

Figure 6:
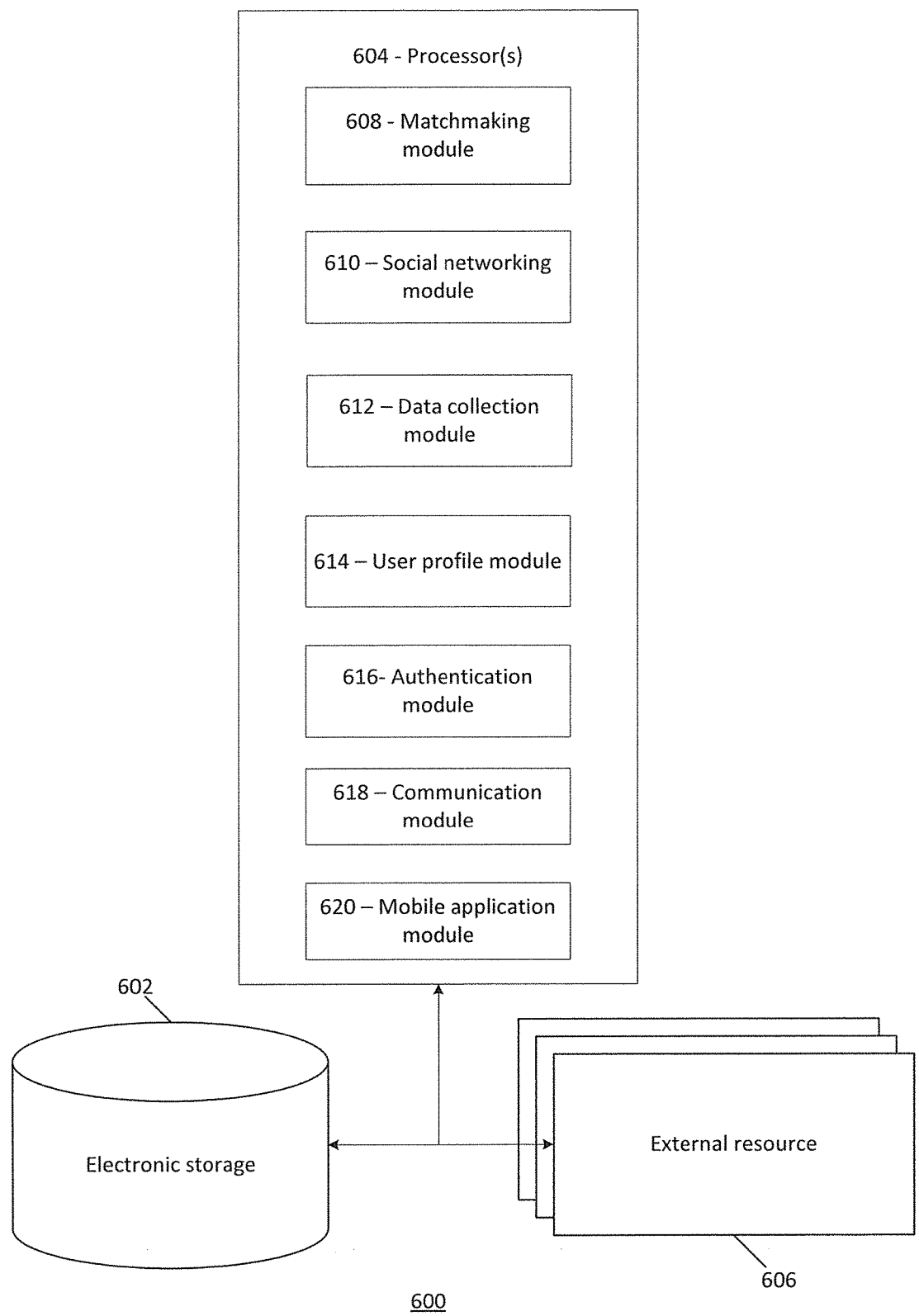
FIG. 6 is a diagram of a processor and related circuitry useful in accordance with aspects of the invention.

FIG. 6 is an example of a block diagram of a game server 600 useful in accordance with aspects of the invention. The game server is coupled to a network (not explicitly shown), for example the internet. In some implementations, game server 600 may comprise one or more of electronic storage 602, processor(s) 604, external resources 606, and/or other components. The various components of game server 600 may be configured for electronic communication among one another. Such communication may be accomplished via one or more networks, one or more direct connections, one or more wireless connections, one or more wired connections, and/or other electronic communication media. Game server 600 may be in communication with user computers and other client computing platforms.

Processor(s) 604 may be configured to provide information processing capabilities within game server 600. For example, processor(s) 604 may configured to execute computer program modules that may include one or more of a matchmaking module 608, a social networking module 610, a data collection module 612, a user profile module 614, an authentication module 616, a communication module 618, and/or other modules. In various embodiments, these modules may perform various operations as further discussed herein.

In some embodiments, matchmaking module 608 performs operations relating to matching users for multiplayer gaming sessions. In some embodiments, matchmaking module 608 matches users seeking an online game session with particular characteristics with users hosting the same online game session with those characteristics. In some embodiments, the users hosting online game sessions act as servers that send game state information to users who have joined the game. For example, a user hosting a game session on his gaming platform may resolve and communicate game state information to player(s) who have joined his gaming session. In some embodiments, matchmaking module 608 matches potential players and hosts based on the players' geography, network connection quality, skill level, experience level, and/or the players' relationship to each other.

In some embodiments, social networking module 610 provides the framework for user-to-user interactions. Social networking module 610 may include a database that stores user relationships, user profiles, user messages, and user social data. Social networking module 610 may provide for social networking features in accordance with the present invention. For example, social networking module 610 may provide the framework to allow a user to "attack" another user's squad.

In some embodiments, user profile module 614 receives and/or determines user information, for example user login names and passwords, email addresses, user skill levels, game system game capabilities, gaming preferences, and/or financial information (e.g., credit card information, billing addresses, and any other information required to complete an e-commerce transaction).

In some embodiments, data collection module 612 performs operations relating to the collection of information regarding potential host systems, user data, social networks, game data, and network connection quality indicators. In some embodiments, authentication module 616 performs operations relating to authentication of users. In some embodiments, communications module 618 performs operations relating to communication with storage and/or external resources, as well as communicating over a network, for example the Internet.

In some embodiments, mobile application module 620 performs operations relating to a mobile application associated with the game server's videogame. For example, mobile application module 620 may host one or more mobile applications that provide services or information relating to the videogame. In some embodiments, mobile application module 620 may host and coordinate the metagame discussed throughout the application. Mobile application module 620 may further comprise databases that store catalogs of goods and/or services available for purchase. The catalogs may contain the details about the various goods and/or services that can be listed in one or more storefronts, including pricing information, a description of the goods and/or services, fulfillment details, etc.

In some implementations, electronic storage 602 may include information about available games, user profile data, social networking data, data collected from previous gameplay sessions, e-commerce data, and/or other data. In some implementations, electronic storage 602 may comprise non-transitory electronic storage media that electronically stores information. Electronic storage 602 may include one or both of system storage that is provided integrally (e.g., substantially non-removable) with game server 600 and/or removable storage that is removably connectable to game server 600 via, for example, a port (e.g., a USB port, a firewire port, etc.) or a drive (e.g., a disk drive, etc.). Electronic storage 602 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 402 may include virtual storage resources, such as storage resources provided via a cloud and/or a virtual private network. Electronic storage 602 may store software algorithms, information determined by processor 604, and/or other information that enables game server 600 to function properly. Electronic storage 602 may be a separate component within game server 600, or electronic storage 602 may be provided integrally with one or more other components of game server 600. For example, in certain implementations, the non-transitory electronic storage media of electronic storage 602 may include a cache (e.g., L1 cache, L2 cache, etc.) of processor 604.

In some implementations, electronic storage 602, processor(s) 604, external resources 606, and/or other components (e.g., additional instances of game servers) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which electronic storage 602, processor(s) 604, external resources 606, and/or other components may be operatively linked via some other communication media.

In some implementations, the external resources 606 may include services and information sources external to game server 600, for example, third-party social networking services external to game server 600, third-party merchandising databases and catalogs, web hosting services, game server services, media streaming services, etc. In some implementations, some or all of the functionality attributed herein to external resources 606 may be provided by resources included in game server 600.

In some implementations, processor(s) 604 may include one or more of a digital processor, an analog processor, a digital circuit designed to process information, an analog circuit designed to process information, a state machine, and/or other mechanisms for electronically processing information. Although processor(s) 604 is shown in FIG. 6 as a single entity, this is for illustrative purposes only. In some implementations, processor(s) 604 may include a plurality of processing units. These processing units may be physically located within the same device, or processor(s) 604 may represent processing functionality of a plurality of distributed devices operating in coordination.

Processor(s) 604 may be configured to execute matchmaking module 608, social networking module 610, data collection module 612, user profile module 614, authentication module 616, communication module 618, mobile application module 620, and/or other modules. Processor(s) 604 may be configured to execute modules 608, 610, 612, 614, 616, 618, 620, and/or other modules by software; hardware; firmware; some combination of software, hardware, and/or firmware; and/or other mechanisms for configuring processing capabilities on processor(s) 604.

It should be appreciated that although modules 608, 610, 612, 614, 616, 618, and 620 are illustrated in FIG. 6 as being co-located within a single processing unit, in implementations in which processor(s) 604 includes multiple processing units, one or more of modules 608, 610, 612, 614, 616, 618, and 620 may be located remotely from the other modules.

The description of the functionality provided by the different modules 608, 610, 612, 614, 616, 618, and 620 provided herein is for illustrative purposes, and is not intended to be limiting, as any of modules 608, 610, 612, 614, 616, 618, and 620 may provide more or less functionality than is described. For example, one or more of modules 608, 610, 612, 614, 616, 618, and 620 may be eliminated, and some or all of its functionality may be provided by other ones of modules 608, 610, 612, 614, 616, 618, and 620. As another example, processor 604 may be configured to execute one or more additional modules that may perform some or all of the functionality attributed below to one of modules 608, 610, 612, 614, 616, 618, and 620.

Although the invention has been discussed with respect to various embodiments, it should be recognized that the invention comprises the novel and non-obvious claims supported by this disclosure. Furthermore, all or portions of the subject innovation can be implemented as a system, method, apparatus, or article of manufacture using standard programming and/or engineering techniques to produce software, firmware, hardware or any combination thereof to control a computer to implement the disclosed innovation.

What is claimed is:

1. A computer-implemented method for providing a metagame associated with a primary videogame, comprising:

entering a first entity into the metagame associated with the primary videogame, the metagame comprising a plurality of entities competing to achieve one or more metagame objectives where the metagame is active during gameplay of a portion of the primary videogame and the metagame determines a game state of the metagame based on actions that occur during gameplay of the portion of the primary videogame;

determining one or more performance metrics associated with a performance of the first entity in the primary videogame;

for each metagame objective, calculating a score for the first entity, the score being based on a scoring algorithm that uses at least one of the determined performance metrics of the first entity;

determining that the first entity has achieved a predefined score in a metagame objective;

in response to determining that the first entity has achieved the predefined score in the metagame objective:

changing the scoring algorithm of the metagame objective; and awarding a bonus to the first entity in the primary videogame.

2. The method of claim 1, wherein the primary videogame is a first-person shooter videogame.

3. The method of claim 2, wherein the one or more performance metrics associated with the performance of the first entity in the videogame comprises the number of kills the first entity achieves in an online multiplayer game mode of the primary videogame.

4. The method of claim 1, wherein the bonus to the first entity in the primary videogame comprises either an experience bonus or an in-game item.

5. The method of claim 1, wherein the one or more performance metrics associated with the performance in the videogame comprises the number of wins the first entity achieves in an online multiplayer game mode of the primary videogame.

6. The method of claim 1, wherein each of the plurality of entities is a team comprised of a plurality of individual team members.

7. The method of claim 6, wherein the number of individual team members in an entity is used in matchmaking for the metagame.

8. The method of claim 1, wherein the metagame takes place over a predefined time period.

9. The method of claim 8, wherein the predefined time period is two weeks.

10. The method of claim 1, wherein the metagame is played using a handheld device and the videogame is played using a non-handheld device.

* * * * *